(12) United States Patent
Pritchatt

(10) Patent No.: US 6,406,067 B1
(45) Date of Patent: Jun. 18, 2002

(54) LATERAL PIPE ADAPTOR

(75) Inventor: Robert James Pritchatt, Cumberworth (GB)

(73) Assignee: Flex-Seal Couplings Limited (GB)

( * ) Notice: Subject to any disclaimer, the term of this patent is extended or adjusted under 35 U.S.C. 154(b) by 0 days.

(21) Appl. No.: 09/930,326

(22) Filed: Aug. 15, 2001

(30) Foreign Application Priority Data

Feb. 8, 2001 (GB) ............................................. 0103100

(51) Int. Cl.$^7$ ................................................. F16L 41/02
(52) U.S. Cl. ........................ 285/197; 285/216; 285/338
(58) Field of Search ................................ 285/197, 216, 285/338

(56) References Cited

U.S. PATENT DOCUMENTS

| | | | | |
|---|---|---|---|---|
| 2,132,636 A | * | 10/1938 | Maahs | 285/197 |
| 3,033,514 A | * | 5/1962 | Grosch | 285/197 |
| 3,841,667 A | * | 10/1974 | Sands | 285/197 |
| 3,879,065 A | * | 4/1975 | Kobayashi | 285/338 |
| 4,747,625 A | * | 5/1988 | Mignet et al. | 285/197 |
| 4,887,851 A | * | 12/1989 | Rush et al. | 285/197 |
| 5,507,536 A | * | 4/1996 | Oliveto, II et al. | 285/197 |
| 6,089,615 A | * | 7/2000 | Jappinen | 285/197 |
| 6,224,115 B1 | * | 5/2001 | Blasch et al. | 285/216 |

FOREIGN PATENT DOCUMENTS

| | | | | |
|---|---|---|---|---|
| EP | 0055003 | | 6/1982 | |
| GB | 983352 | | 2/1965 | |
| GB | 1576038 | | 10/1980 | |
| GB | 2214255 | | 8/1989 | |
| GB | 2323904 | | 10/1998 | |
| GB | 2341652 | | 3/2000 | |
| JP | 404181093 | * | 6/1992 | 285/197 |
| JP | 404194490 | * | 7/1992 | 285/197 |
| JP | 404203691 | * | 7/1992 | 285/197 |
| JP | 404285389 | * | 10/1992 | 285/197 |
| JP | 406201083 | * | 7/1994 | 285/197 |
| JP | 406207697 | * | 7/1994 | 285/197 |

* cited by examiner

*Primary Examiner*—Eric K. Nicholson
(74) *Attorney, Agent, or Firm*—Trexler, Bushnell, Giangiorgi, Blackstone & Marr, Ltd.

(57) ABSTRACT

A lateral adaptor (6) for a main pipe (1), such as a structured wall plastics pipe consisting of a cylindrical shell (2) and a corrugated shell (3) bonded to the outside thereof, comprises a sleeve (7) with a flange (8) extending outwardly at one end and curved to match the internal curvature of the main pipe (1) and adapted at the other end (as by means of a socket (9) or a spigot, not illustrated) for connection of a branch pipe (not shown), an annular movable member (10) slidable on the sleeve (7) and having a curved face (11) to match the external curvature of the main pipe (1), an elastomeric seal ring (12) held captive between the to flange (8) on the sleeve (7) and the movable member (10) and having inner and outer curved faces (13, 14) to match the curvature of the flange (8) on the sleeve (7) and the face (11) of the movable member (10) respectively, an annular abutment member (15) adjacent the face (16) of the movable member (10) remote from its curved face (11), an annular shoulder (17) on the sleeve (7) constituting a projection abutted by the face (18) of the abutment member (15) remote from the movable member (10) and loading means (in the form of axial screws (19) through the abutment member) for urging the movable member (10) away from the abutment member (15) to compress the seal ring (12) axially after passing the flange (8) of the sleeve (7) through the hole (4, 5) in the main pipe (1) to bring the seal ring (12) within the hole, the axial compression of the seal ring (12) causing radial expansion of it into sealing engagement with all parts (4, 5) of the hole and all round the sleeve (7).

9 Claims, 7 Drawing Sheets

LATERAL PIPE ADAPTOR

This invention relates to a lateral pipe adaptor, more particularly for connecting into a structured wall plastic pipe a lateral pipe of smaller diameter.

Structured wall plastic pipes are used widely for drainage applications throughout Europe and are manufactured from 100 mm bore to 1050 mm and above. These pipes can be made from a range of plastic materials, such as polyethylene or polypropylene depending on the manufacturer. They are formed in a two-layer construction. The inner layer provides a smooth surface for the bore of the pipe. The outer layer is of corrugated construction that creates ribs around the circumference of the pipe, these ribs being equispaced along the length of the pipe. The ribs are also hollow. Their purpose is to provide structural strength in the pipe wall.

It is often necessary to connect into these pipes, smaller lateral pipes from gullies or other such drainage points. Normal practice with these pipe systems is to use a purpose made branch fitting. Due to the popularity of using lateral adaptors to make connections into rigid pipe systems, e.g. concrete or clay, there is a demand for a similar solution for flexible pipes (plastic).

The lateral pipe will commonly be of around 150 mm bore and often of similar construction to the main pipe, in this case structured wall plastic. Other materials such as clay or solid wall plastic will also be used in some circumstances. The method of access into the pipe is by the use of a holesaw that leaves a fairly untidy cut surface that cannot be reasonably or easily made good on site. It is a requirement that any lateral adaptor will overcome this and create and maintain a leaktight connection that prevents leakage from the pipe and ingress of groundwater.

The object of the invention is to provide a lateral pipe adaptor that is easy to install in a main pipe with a hole cut with a holesaw to provide a means of connecting lateral pipes of any material by means of a proprietary pipe adaptor between the spigot of the lateral pipe adaptor and the incoming lateral pipe.

According to the present invention, a lateral pipe adaptor for a main pipe, such as a structured wall plastics pipe, comprises a cylindrical sleeve with a flange extending outwardly at one end and curved to match the internal curvature of the main pipe and adapted at the other end for connection of a branch pipe (e.g. by provision of a spigot or socket), an annular movable member slidable on the sleeve and having a curved face to match the external curvature of the main pipe, an elastomeric seal ring held captive between the flange of the sleeve and the movable member and having inner and outer curved faces to match the curvature of the flange on the sleeve and the movable member respectively, an annular abutment member adjacent the face of the movable member remote from its curved face, at least one projection on the sleeve (e.g. an annular shoulder) abutted by the face of the abutment member remote from the movable member, and loading means for urging the movable member away from the abutment member to compress the seal ring axially after passing of the flange of the sleeve through a hole in the main pipe to bring the seal ring within the hole, the axial compression of the seal ring causing radial expansion of the seal ring into sealing engagement with all parts of the hole in the main pipe and all round the sleeve. A socket provided for the connection of a branch pipe may be an interchangeable component attached to the sleeve.

The seal ring preferably has an axial length appreciably in excess of the depth of the hole in the main pipe, to ensure that when axially compressed in a hole in a structured wall plastics pipe all the edges within the hole are sealingly contacted by the seal ring.

The sleeve preferably has an increasing outer diameter adjacent its flange, to promote radial expansion of the seal ring from its face adjacent the flange, particularly to ensure sealing contact all round the inner edge of the hole in a structured wall plastics pipe.

The sleeve and the movable and abutment members may be conveniently moulded in plastics, and the movable member is provided with a curved flange (or "saddle") providing the curved face matching the outer curvature of the main pipe co-moulded with a thin cylindrical wall having bosses with shallow recesses for location of axial screws projecting from lugs on the abutment member, and the lugs of the latter being provided with non-circular recesses to accommodate non-rotatable nuts for the axial screws.

For convenience of manufacture and assembly, the movable member is preferably formed in two identical parts, split on a diametral line and each provided with at least one projection and one recess for engagement with the recess and projection, respectively, of the other upon fitting of the parts round the sleeve.

Likewise, the abutment member is preferably formed with a split at one side only and provided with overlapping bosses having respectively a projection and a recess for engagement with each other after fitting the abutment member round the sleeve in abutting engagement with the projection (e.g. annular shoulder) on the sleeve.

An embodiment of the invention will now be described, by way of example only, with reference to the accompanying drawings, in which.

Figure 2:
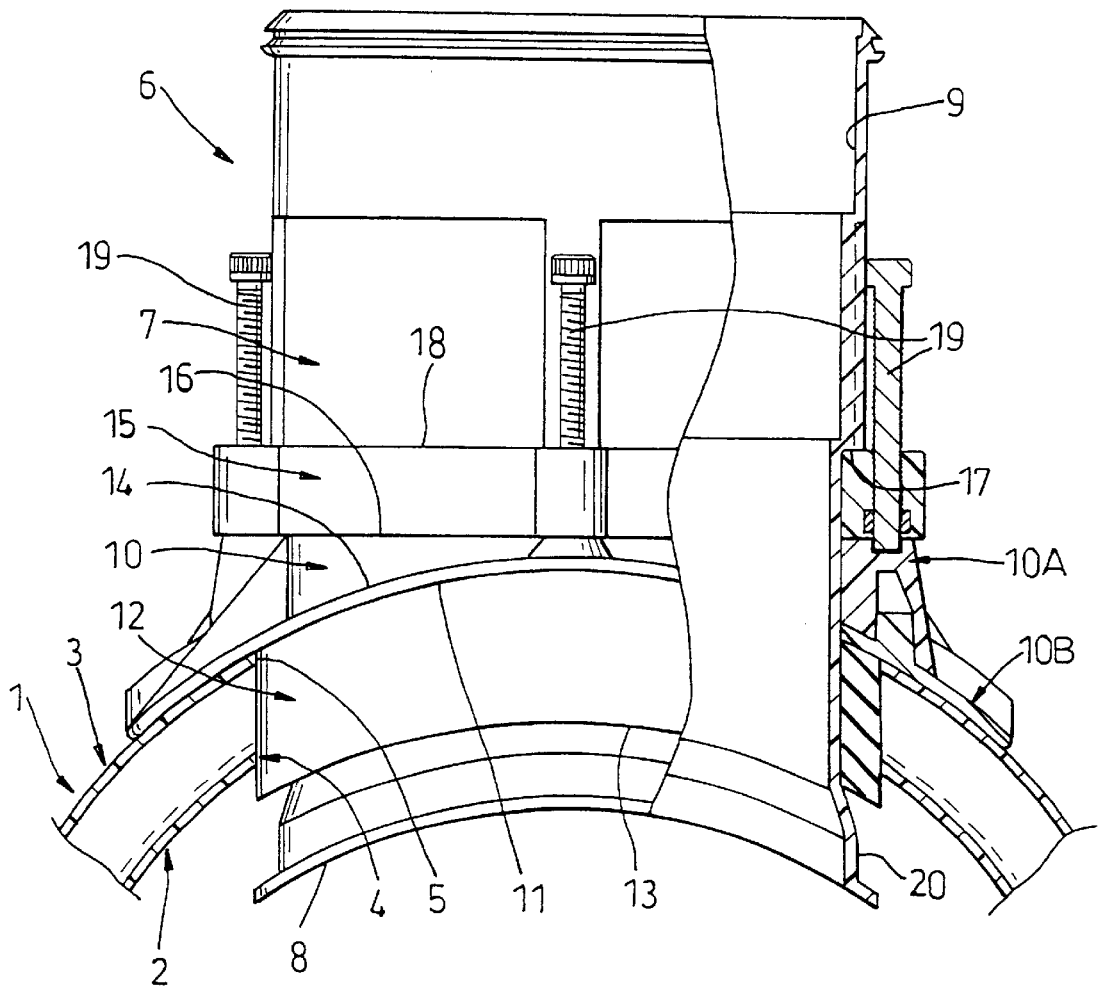
FIG. 2 is a fragmentary transverse section through the structured wall plastics pipe including the hole and showing in relation thereto a lateral pipe adaptor in accordance with the invention as initially applied.
Figure 3:
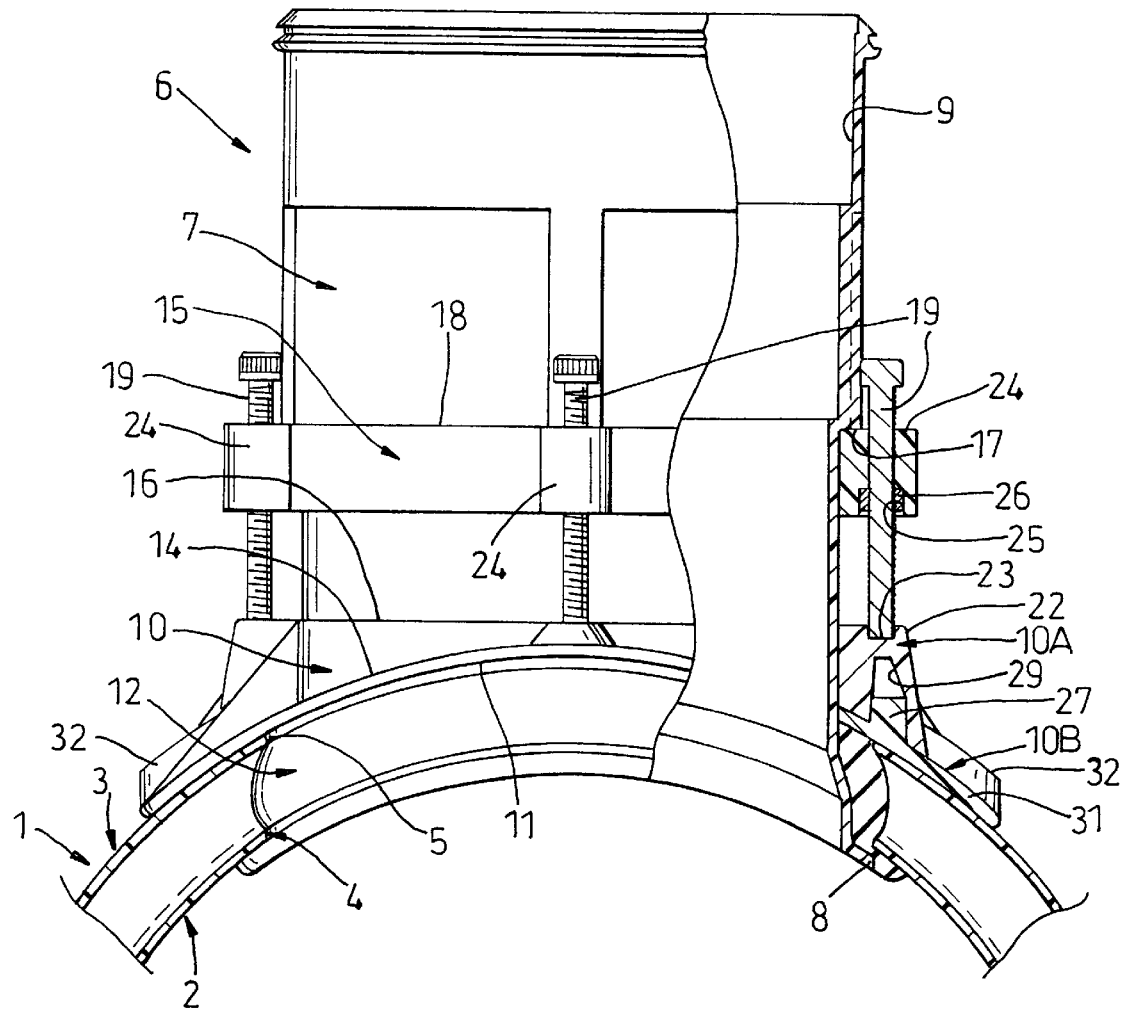
Figure 5:
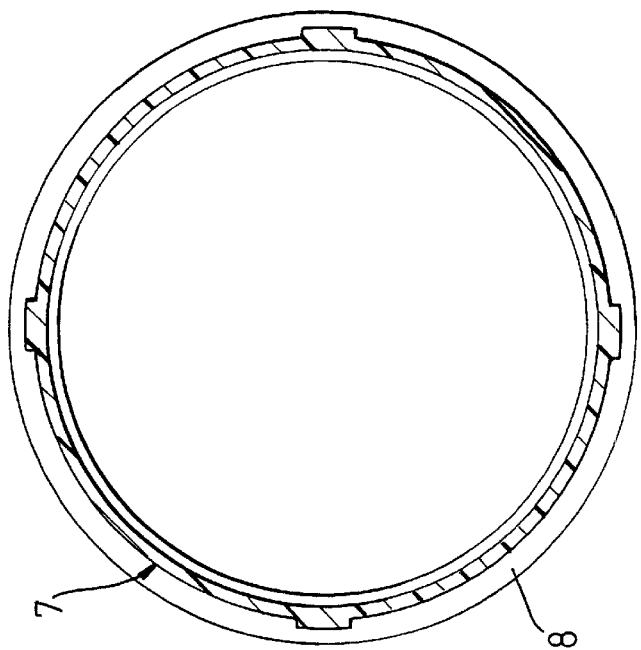
Figure 4:
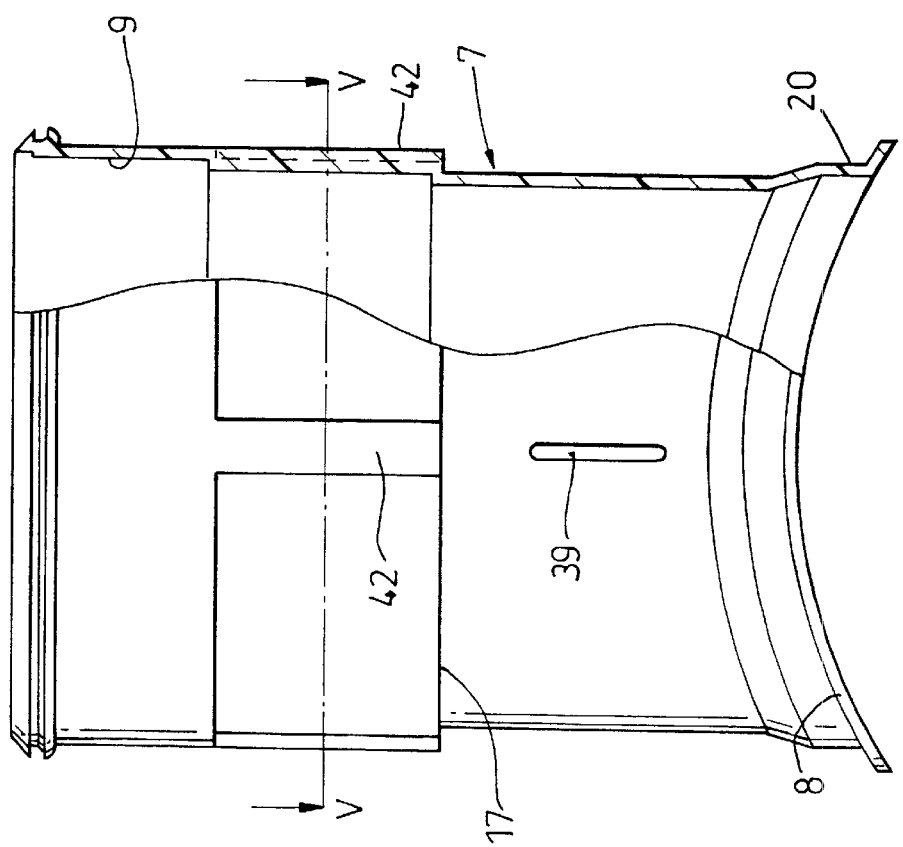
Figure 6:
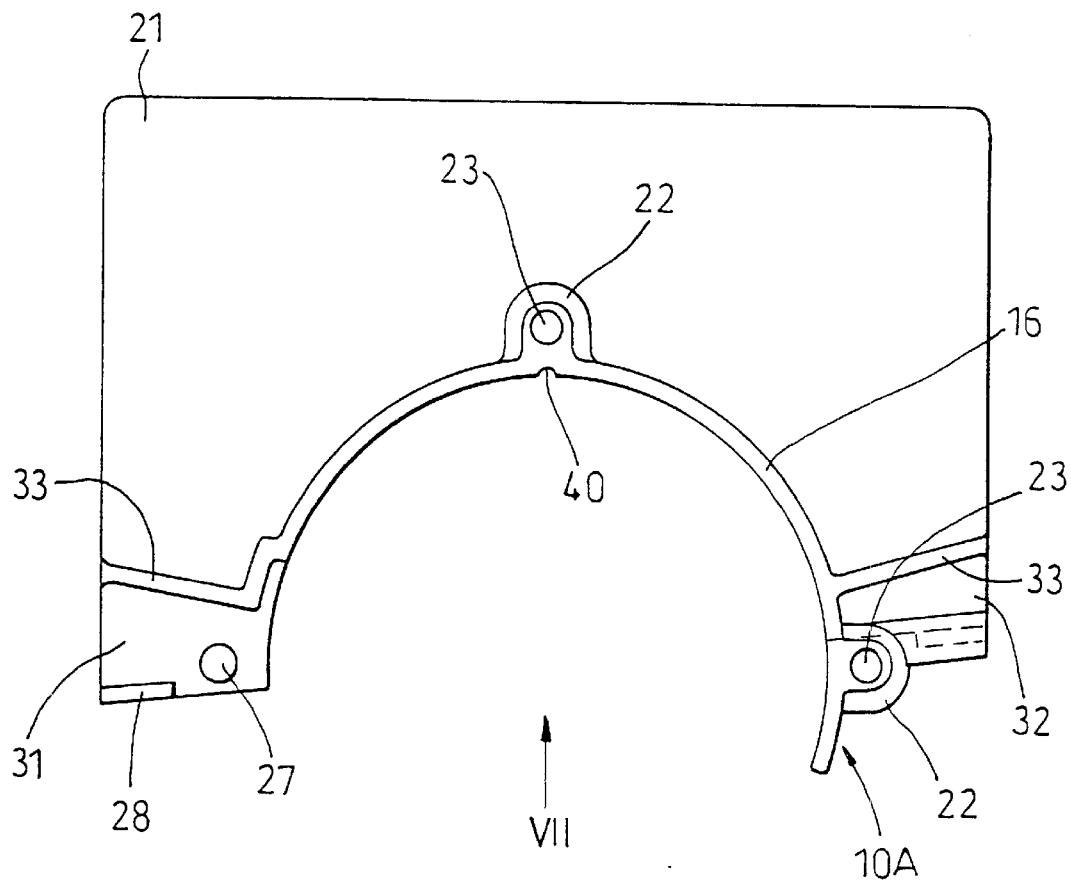
Figure 7:
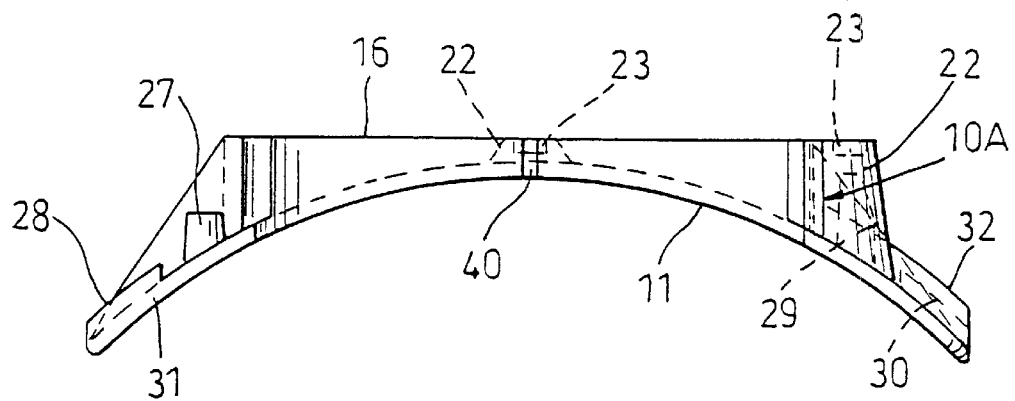
Figure 8:
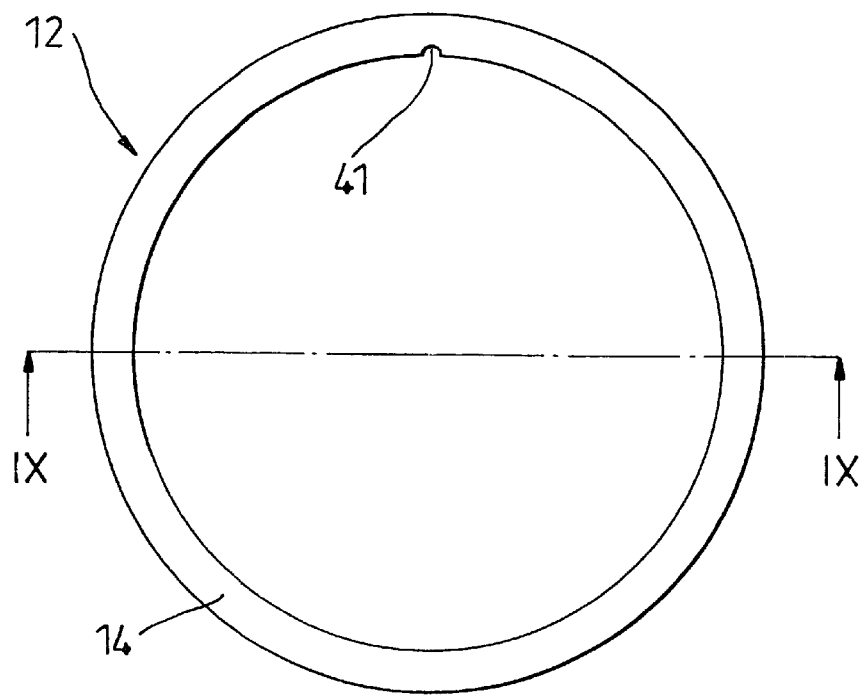
Figure 9:
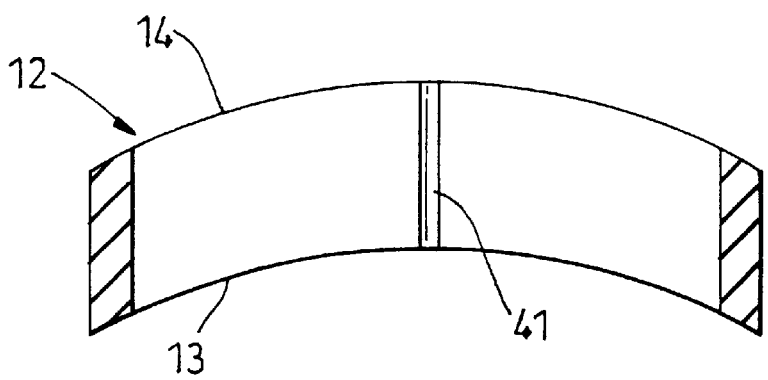
Figure 10:
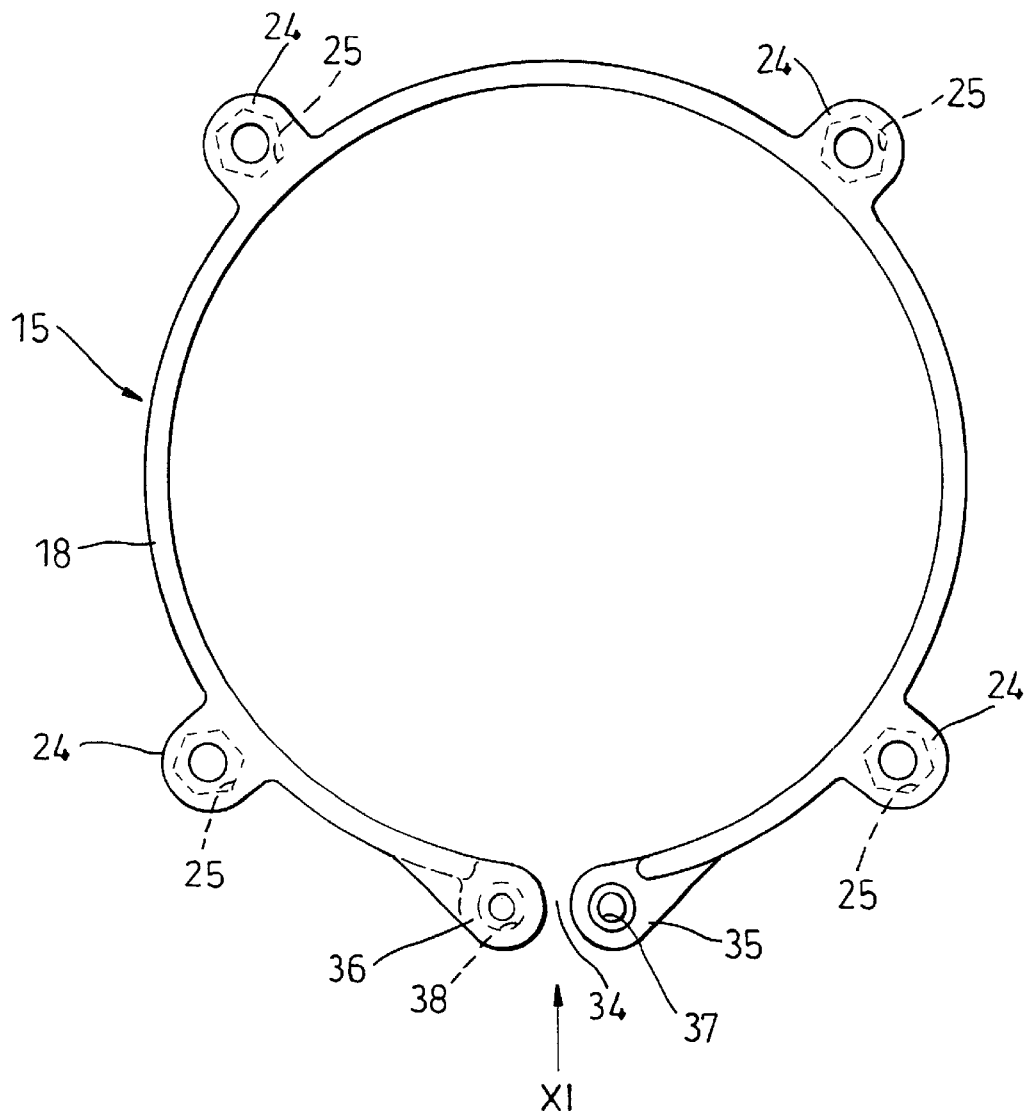
Figure 11:
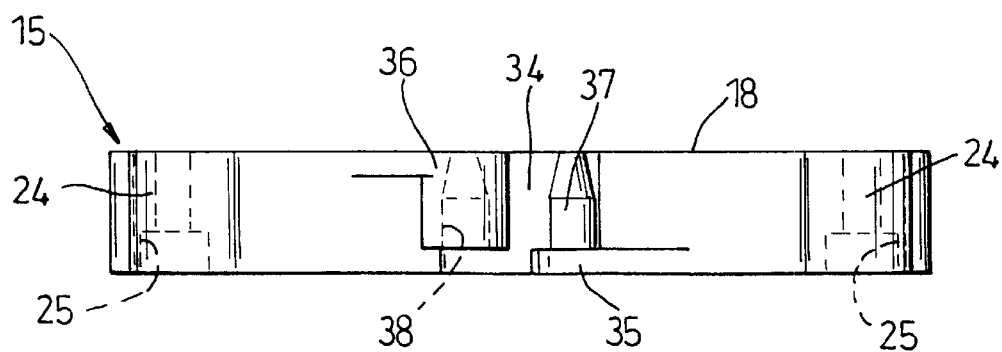

FIG. 3 corresponds to FIG. 2 but shows the adaptor after operation to effect sealing within the hole;

FIG. 4 is part-sectional side elevation of the flanged sleeve seen in FIGS. 2 and 3;

FIG. 5 is a section taken from the line V—V of FIG. 4;

FIG. 6 is a plain view of one of the identical halves of the annular movable member seen in FIGS. 2 and 3;

FIG. 7 is a side elevation of the annular movable member as viewed in the direction of the arrow VII of FIG. 6;

FIG. 8 is plan view of the elastomeric seal ring seen in FIGS. 2 and 3;

FIG. 9 is a section taken from the line IX—IX of FIG. 8;

FIG. 10 is a plan view of the split annular abutment member seen in FIGS. 2 and 3, and FIG. 11 is a side elevation of the annular abutment member as viewed in the direction of the arrow XI of FIG. 10.

Figure 1:
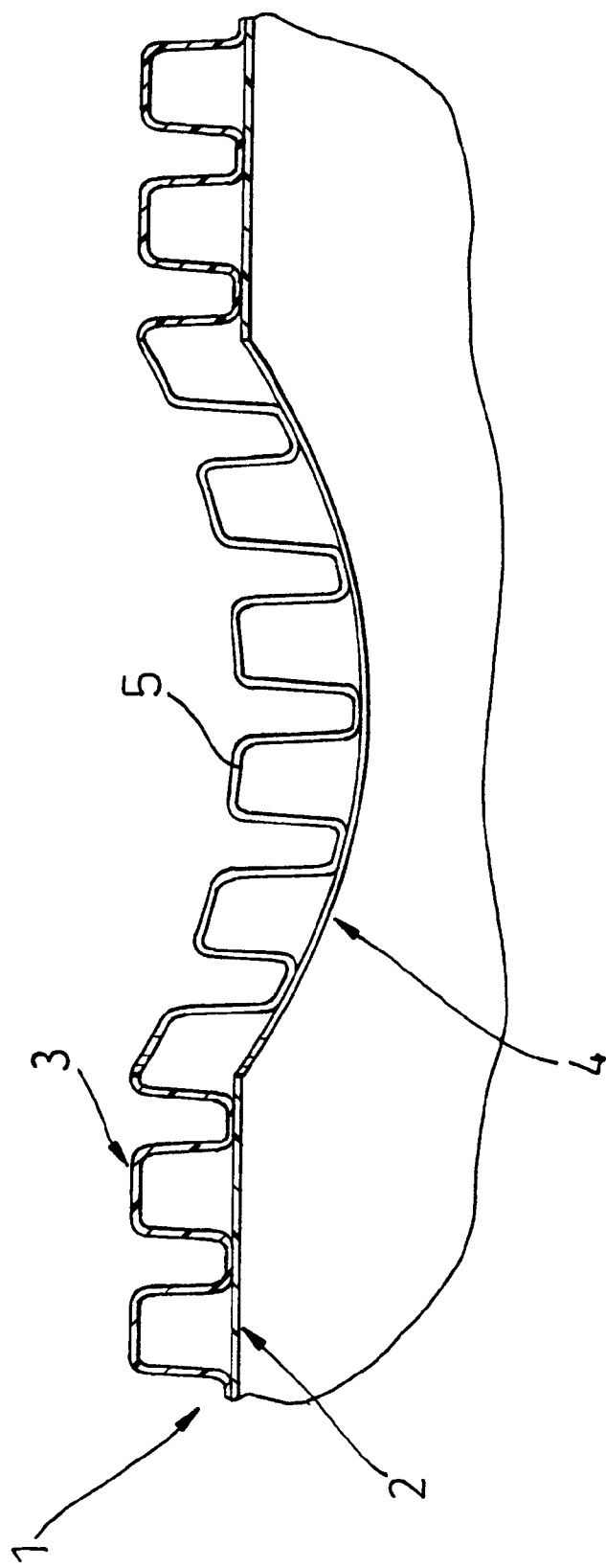
FIG. 1 is a fragmentary longitudinal section through a structured wall plastics pipe including a hole for the purpose of connecting a lateral pipe.

In FIG. 1 a portion of wall 1 of a structured plastics pipe consisting of a cylindrical shell 2 and a corrugated shell 3 bonded to the outside thereof (and hereafter referred to as "the main pipe") includes a hole 4 for the purpose of connecting a lateral pipe (not shown in any of the drawings and hereafter referred to as "a branch pipe"). It will be evident from FIG. 1 that the hole 4 extends through the corrugated shell 3 and results in a convoluted edge 5 posing a problem with regard effectively securing and sealing thereto an adaptor for a branch pipe, the solution of which problem is afforded by the adaptor shown in FIGS. 2 and 3 and its component parts shown in FIGS. 4 to 11.

The adaptor 6 (FIGS. 2 and 3) in accordance with the invention comprises a sleeve 7 (see also FIGS. 4 and 5) with a flange 8 extending outwardly at one end and curved to match the internal curvature of the main pipe 1 and adapted at the other end (as by means of a socket 9 or a spigot, not illustrated) for connection of a branch pipe (not shown), an annular movable member 10 (see also FIGS. 6 and 7) slidable on the sleeve 7 and having a curved face 11 to match the external curvature of the main pipe 1, an elastomeric seal ring 12 (see also FIGS. 8 and 9) held captive between the flange 8 on the sleeve 7 and the movable member 10 and having inner and outer curved faces 13, 14, respectively, to match the curvature of the flange 8 on the sleeve 7 and the face 11 of the movable member 10 respectively, an annular abutment member 15 (see also FIGS. 10 and 11) adjacent the face 16 of the movable member 10 remote from its curved face 11, an annular shoulder 17 on the sleeve 7 constituting a projection abutted by the face 18 of the abutment member 15 remote from the movable member 10, and loading means (in the form of axial screws 19 through the abutment member 15) for urging the movable member 10 away from the abutment member 15 to compress the seal ring 12 axially (see FIG. 3) after passing the flange 8 of the sleeve 7 through the hole 4, 5 in the main pipe 1 to bring the seal ring 12 within the hole (see FIG. 2), the axial compression of the seal ring 12 causing radial expansion of it into sealing engagement with all parts 4, 5 of the hole and all round the sleeve 7, as shown in FIG. 3.

It will be evident from FIG. 2 that the seal ring 12 has an axial length appreciably in excess of the depth of the hole 4, 5 in the main pipe 1, to ensure that when axially compressed as shown in FIG. 3 all the edges within the hole are sealingly contacted by the seal ring.

The sleeve 7 has an increasing outer diameter 20 adjacent its flange 8, to promote radial expansion of the seal ring 12 from its face 13 adjacent the flange, particularly to ensure sealing contact all round the inner edge of the hole 4. This also helps in securing the adaptor 6 mechanically to the main pipe.

The sleeve 7 and the movable and abutment members 10, 15, respectively, are indicated as moulded in plastics, and the movable member 10 is provided with a curved flange or "saddle" 21 providing the curved face 11 matching the outer curvature of the main pipe 1 co-moulded with a thin cylindrical wall having bosses 22 with shallow recesses 23 for location of the axial screws 19 projecting from lugs 24 on the abutment member 15, and the lugs 24 are provided with non-circular recesses 25 to accommodate non-rotatable nuts 26 for the axial screws.

For convenience of manufacture and assembly, the movable member 10 is formed in two identical parts 10A, 10B (one only—10A—being shown in FIGS. 6 and 7) split on a diametral line and each provided with pairings of projections and recesses 27, 28 and 29, 30, respectively, for engagement with the recesses and projections, respectively, of the other upon fitting of the parts 10A, 10B round the sleeve, the projections and recesses being provided on or in overlapping saddle portions 31, 32, respectively. Stiffening ribs 33 are also provided between the annular wall of the movable member 10 and the saddle 21 adjacent the overlapping portions 31, 32.

Likewise, the abutment member 15 is formed with a split 34 at one side only and provided with overlapping bosses 35, 36 having respectively a projection 37 and a recess 38 for engagement with each other after fitting the abutment member 15 round the sleeve 7 in abutting engagement with the shoulder 17 on the sleeve.

To ensure correct location of the movable member 10 and the seal ring 12 on the sleeve 7, the latter is provided with a rib 39 (see FIG. 4) and the movable member and seal ring are provided with grooves 40, 41, respectively, to mate with the rib. Also, the sleeve 7 has stiffening ribs 42 located where the screws 19 (carried by the abutment member 15) will lie alongside when the abutment-members located by the tips of the screws engaged in the recesses 23 in the bosses of the movable member 10.

What is claimed is:

1. A lateral pipe adaptor for a main pipe comprising a cylindrical sleeve with a flange extending outwardly at one end and curved to match the internal curvature of the main pipe and adapted at the other end for connection of a branch pipe, an annular movable member slidable on the sleeve and having a curved face to match the external curvature of the main pipe, an elastomeric seal ring held captive between the flange of the sleeve and the movable member and having inner and outer curved faces to match the curvature of the flange on the sleeve and the movable member respectively, an annular abutment member adjacent the face of the movable member remote from its curved face, at least one projection on the sleeve abutted by the face of the abutment member remote form the movable member, and loading means for urging the movable member away from the abutment member to compress the seal ring axially after passing of the flange of the sleeve through a hole in the main pipe to bring the seal ring within the hole, the axial compression of the seal ring causing radial expansion of the seal ring into sealing engagement with all parts of the hole in the main pipe and all round the sleeve, the sleeve and the movable and abutment members being moulded in plastics and the movable member being provided with a curved flange providing the curved face matching the outer curvature of the main pipe co-moulded with a thin cylindrical wall having bosses with shallow recesses for location of axial screws projecting from lugs on the abutment member, the lugs of the latter being provided with non-circular recesses to accommodate non-rotatable nuts for the axial screws, and the movable member being formed in two identical parts, split on a diametral line and each provided with at least one projection and one recess for engagement with the recess and projection, respectively, of the other upon fitting of the parts round the sleeve.

2. An adaptor as in claim 1, wherein a spigot is provided on the sleeve for connection of a branch pipe.

3. An adaptor as in claim 1, wherein a socket is provided on the sleeve for connection of a branch pipe.

4. An adaptor as in claim 3, wherein the socket provided for the connection of a branch pipe is an interchangeable component attached to the sleeve.

5. An adaptor as in claim 1, wherein the at least one projection on the sleeve is an annular shoulder.

6. An adaptor as in claim 1, wherein the seal ring has an axial length appreciably in excess of the depth of the hole in the main pipe, to ensure that when axially compressed in a hole in a structured wall plastics pipe all the edges within the hole are sealingly contacted by the seal ring.

7. An adaptor as in claim 6, wherein the sleeve has an increasing outer diameter adjacent its flange, to promote radial expansion of the seal ring form its face adjacent the flange, to ensure sealing contact all round the inner edge of the hole in a structured wall plastics pipe.

8. An adaptor as in claim 1, wherein the abutment member is formed with a split at one side only an provided with overlapping bosses having respectively a projection and a recess for engagement with each other after fitting the abutment member round the sleeve in abutting engagement with the projection on the sleeve.

9. An adaptor as in claim 1, wherein the sleeve is provided with a rib and the movable member and seal ring are provided with grooves to mate with the rib to ensure correct location of the movable member and the seal ring on the sleeve.

* * * * *